Jan. 12, 1932.  W. H. PERCIVAL  1,840,738
FREEZER COUNTER
Filed July 21, 1930    2 Sheets-Sheet 1
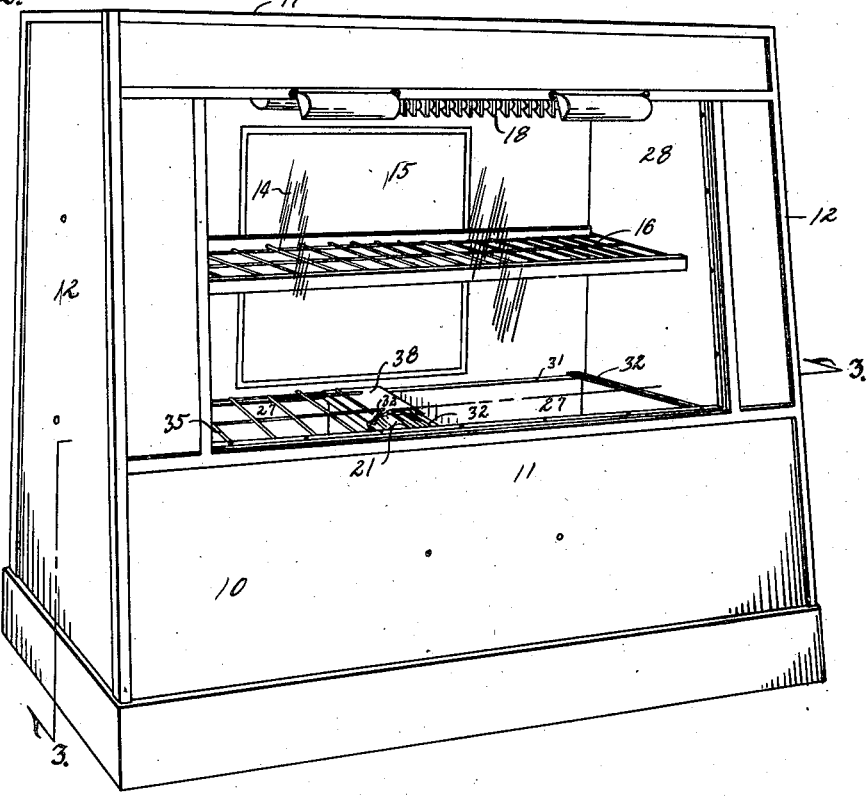
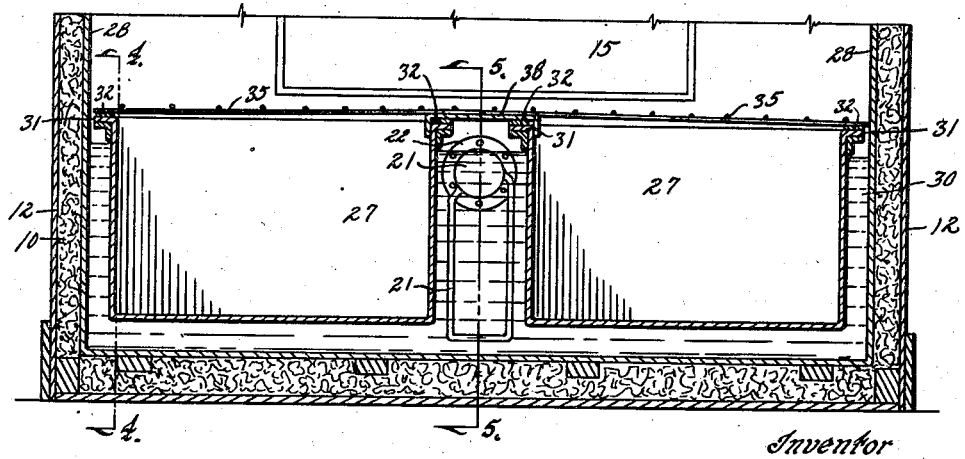

Jan. 12, 1932. W. H. PERCIVAL 1,840,738
FREEZER COUNTER
Filed July 21, 1930 2 Sheets-Sheet 2
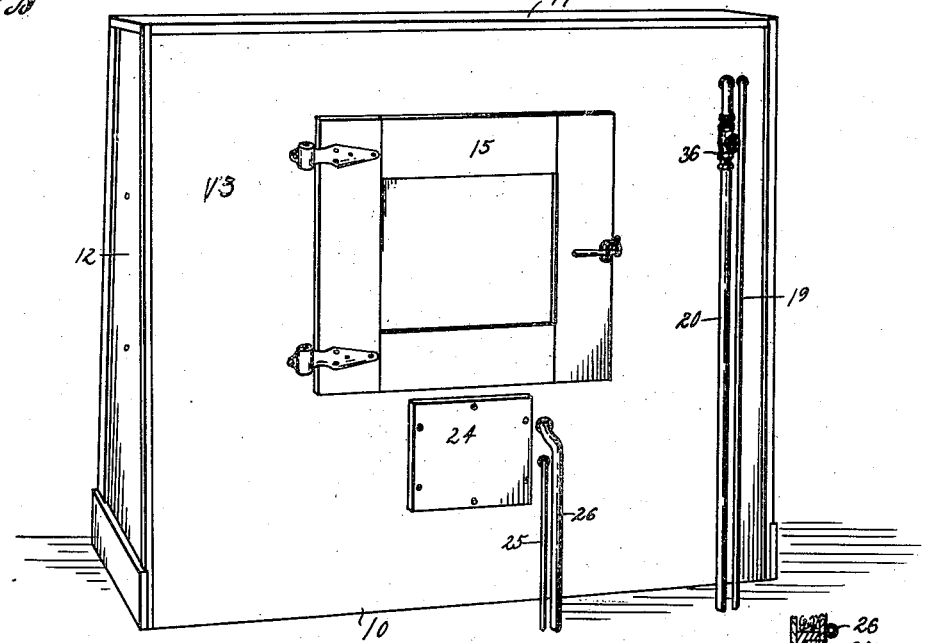
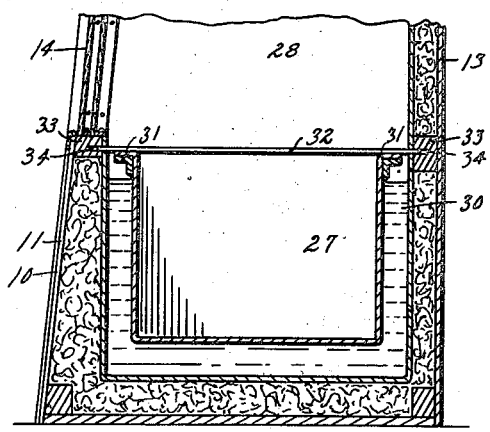
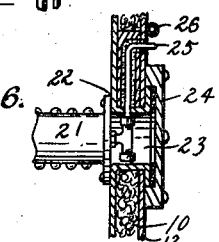
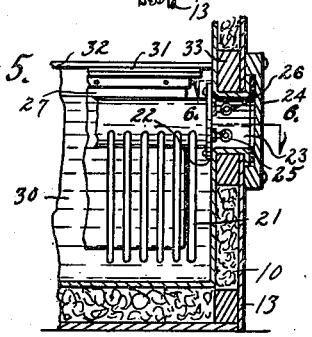

Patented Jan. 12, 1932

1,840,738

UNITED STATES PATENT OFFICE

WORTH H. PERCIVAL, OF DES MOINES, IOWA, ASSIGNOR TO C. L. PERCIVAL & CO., OF DES MOINES, IOWA

FREEZER COUNTER

Application filed July 21, 1930. Serial No. 469,361.

My present invention relates to freezer counters of the kind used in butcher shops, delicatessen stores, grocery stores and the like.

It is the purpose of my invention to provide a freezer counter of simple construction employing in the upper portion a freezing coil and having a novel arrangement as to storage tanks in the lower portion held in brine with the provision of a freezing coil for the brine, parts being arranged for the convenient placing of the food stuffs in the tanks in such a way as to permit the upper coil to be properly defrosted with a minimum of inconvenience to the store operator.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a perspective view of a freezing counter embodying my invention.

Figure 2 is a perspective view of the same from behind.

Figure 3 is a detail sectional view taken on the line 3—3 of Figure 1.

Figure 4 is a detail sectional view taken on the line 4—4 of Figure 3.

Figure 5 is a similar view taken on the line 5—5 of Figure 3; and

Figure 6 is a horizontal sectional view taken on the line 6—6 of Figure 5.

In the accompanying drawings I have used the reference numeral 10 to indicate generally the casing of the freezing counter. This casing has the lower closed portion 11 and has ends 12 extending upwardly substantially above the closed portion 11 as shown. The back 13 also extends substantially above the closed portion 11, the front above the closed portion 11, being preferably made of spaced glass panes 14 for display.

The back is provided with a hinged door 15 for providing access to the food in the interior of the freezing counter. Suitably supported in the upper part of the freezing counter is a food receiving shelf 16 which should, preferably, be of foraminous character if desired.

The casing has a top 17. In the upper portion of the casing 10 just under the top as shown is a freezing coil 18. The pipes 19 and 20 leading thereto and therefrom emerge through the back wall of the casing 10 as shown in Figure 2. In freezing counters of this general type considerable inconvenience is encountered on account of the necessity for defrosting the freezing coil at regular intervals. This involved the necessity for taking out the food stuffs, putting them in some other refrigerator and defrosting the coil which is usually done by directing against it a current of air. It is not desirable to take the food products out of the cool air and in the transfer they are likely to be unduly warmed.

To avoid the necessity for taking the food out of the freezing counter I have provided the following construction:

In the lower part which I have called the closed part 11 of the casing 10 about midway between the ends thereof I provide another freezing coil 21 supported on the back wall 13 as at 22. The back wall has a passageway 23 covered by a plate 24. The intake and outlet pipes 25 and 26 are extended into and through the back 13 and into the passageway 23 and thence to the coil 21. On each side of the coil 21 are compartments, or receptacles or tanks 27. The lower part of the casing 10 is suitably lined as at 28 with material which will not corrode when subjected to salt water.

The tanks 27 rest in a brine bath 30. For holding them against rising, I extend across the flanged end 31 of each tank 27 a retaining bar 33. At the front and rear of the casing 10 are provided slots 34 which receive the ends of the bars 32, parts being so arranged that the bar 32 as shown for instance in Figure 4, can be slid to the left far enough to permit it to be withdrawn from the right hand slot 34 for convenience in moving the bar when taking out the tanks for cleaning or repairing or replacement. I preferably rest a foraminous shelf or shelves 35 on the tanks 27 for receiving food products.

In the practical use of my freezing counter, it is placed as an ordinary counter and the cooling pipes are installed. The shelf 16 is the chief display shelf and the goods primarily intended for display may be placed thereon, or the goods may be placed on the shelf or shelves 35. The coil 21, being in brine, never becomes frosted. It is, however, desirable to use the upper coil and it becomes necessary at regular intervals to defrost the upper coil.

With my type of freezing counter this defrosting can be accomplished conveniently and quickly without unduly warming up the goods and with a minimum amount of movement thereof. In defrosting the upper coil the shelves 35 are removed, and the goods in the counter placed in the tanks 27. A defrosting pan is placed on the shelf 16 and the valve 36 in the tube 20 is closed. The back door is then opened and the draft from a fan directed through the door opening upon the upper freezing coil. I find that the coil can be defrosted ordinarily in about twenty minutes without unduly warming up the goods in the storage tanks in the lower part of the counter. After the coil 18 has been properly defrosted, the valve 36 is opened and, as soon as the defrosted compartment is cooled to the proper temperature, the goods may be moved up to the display shelves 16 and 35.

I have not attempted to disclose the general details of the structure of my improved freezing counter other than those which are of importance for explaining the present invention. It should be mentioned, perhaps that a cap 38 is provided for the adjacent walls of the tank 27 for covering the space in which the freezing coil 21 is received (see Figure 3).

It is obvious that changes can be made in the construction and arrangement of the parts, in the materials used without departing from the essential features and purposes of my present invention and it is my purpose to cover by my claims any modified forms of structure or use of mechanical equivalents which may be reasonably included within the scope of such claims.

I claim as my invention:

1. In a freezing counter, a casing having a door for access to the upper portion thereof, a display shelf in the upper portion of said casing, a freezing coil above said display shelf, the lower part of said casing having a water tight lining and being adapted to receive and hold brine, a tank received in said brine receiving part of the device, means for holding the tank against upward movement, a valve on said tank and a freezing coil adjacent said tank in the lower part of the casing which is adapted to hold brine.

2. In a freezing counter, a casing having a door for access to the upper portion thereof, a display shelf in the upper portion of said casing, a freezing coil above said display shelf, the lower part of said casing having a water tight lining and being adapted to receive and hold brine, a pair of spaced tanks in the lower part of the casing adapted to be received and held in a brine bath, a second freezing coil arranged between said tanks.

3. In a freezing counter, a casing having a door for access to the upper portion thereof, a display shelf in the upper portion of said casing, a freezing coil above said display shelf, the lower part of said casing having a water tight lining and being adapted to receive and hold brine, a pair of spaced tanks in the lower part of the casing adapted to be received and held in a brine bath, a second freezing coil arranged between said tanks, cross bars above said tanks for holding them down, the walls of said casing having parts for cooperating with said cross bars for holding them in position.

4. In a freezing counter, a casing having a door for access to the upper portion thereof, a display shelf in the upper portion of said casing, a freezing coil above said display shelf, the lower part of said casing having a water tight lining and being adapted to receive and hold brine, a pair of spaced tanks in the lower part of the casing adapted to be received and held in a brine bath, a second freezing coil arranged between said tanks, cross bars above said tanks, the casing having slots in its walls for receiving said cross bars, parts being so arranged as to permit the ends of the bars to be conveniently inserted into or removed from said slots.

5. In a freezing counter of the kind described, a casing having a lower portion closed at the bottom, sides and ends and an upper portion with a transparent front and a door in its rear, a display shelf in the upper portion of said casing, a freezing coil above said display shelf, the lower portion of said casing being adapted to receive and hold brine, storage tanks in said brine holding portion, means for holding the storage tanks against rising, removable foraminous shelves supported above the storage tanks, a second freezing coil arranged between the tanks in the brine holding portion of the casing.

6. In a freezing counter of the kind described, a casing having a lower portion closed at the bottom, sides and ends and an upper portion with a transparent front and a door in its rear, a display shelf in the upper portion of said casing, a freezing coil above said display shelf, the lower portion of said casing being adapted to receive and hold brine, storage tanks in said brine holding portion, means for holding the storage tanks against rising, removable foraminous shelves supported above the storage tanks, a removable cap for covering the space between the brine tanks above the second freezing coil hereinafter mentioned, a second freezing coil arranged between the tanks in the brine holding portion of the casing.

7. In a device of the kind described, a casing having in its upper part a display chamber and having in its lower part a brine holding compartment, a food receiving member in said compartment, a freezing coil in the display chamber, a door opening into the display chamber, and means below the freezing coil for supporting a defrosting pan.

Des Moines, Iowa, July 11, 1930.

WORTH H. PERCIVAL.